Aug. 8, 1967  F. I. GOSPODNETICH  3,334,433
MARKING DEVICES OR EAR TAGS FOR ANIMALS
Filed June 21, 1965

United States Patent Office 3,334,433
Patented Aug. 8, 1967

3,334,433
MARKING DEVICES OR EAR TAGS
FOR ANIMALS
Francis Ivan Gospodnetich, Maratoto Road, Hikutaia
R.D., Thames Line, New Zealand
Filed June 21, 1965, Ser. No. 465,267
Claims priority, application New Zealand, June 23, 1964,
138,546; Aug. 11, 1964, 139,057
6 Claims. (Cl. 40—301)

ABSTRACT OF THE DISCLOSURE

An ear tag for animals made from a suitable plastic material having some resilience, the ear tag defining an H shape with the side members of the H thickening adjacent their extremities.

---

This invention relates to marking devices or ear tags for animals.

The provision of a satisfactory marking device or ear tags for animals is a problem which causes considerable difficulty largely because the ear tags tend to get caught on twigs or stalks causing ear discomfort to the animal or tearing off of the tag. Furthermore, there is some difficulty in providing a suitable area to enable indicia to be displayed on the tag.

It is an object of the present invention to provide a marking device or ear tag for an animal which may be associated with the ear of an animal being tagged and when once associated one which cannot easily be dislodged.

It is a further object to provide a marking device or ear tag for an animal which when positioned will not easily catch in bushes or other objects thus minimising the possibility of foreign matter being caught by the ear-tag causing irritation to the animal.

It is a yet further object of the present invention to provide a marking device or ear tag for an animal which is resiliently flexible enabling ready deformation for positioning in association with the animal's ear.

It is a further object of the present invention to provide a marking device or ear tag for an animal which will provide an area adaptable for indicia to be displayed or provided thereon allowing for the ready identification of the animal wearing the tag.

One preferred form of the invention will now be described with reference to the accompanying drawings in which.

Figure 1:
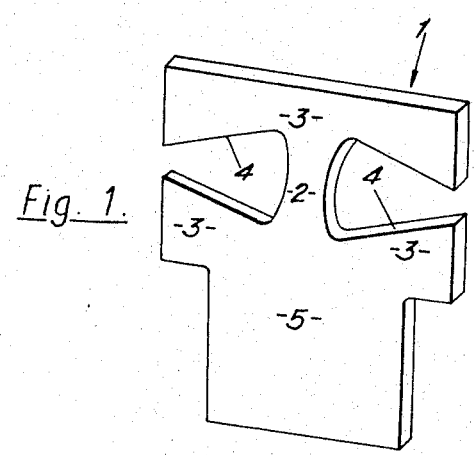
FIGURE 1 is a pictorial view of an ear tag according to the present invention.
Figure 2:
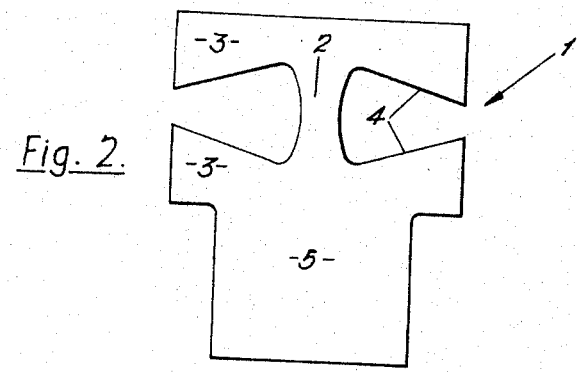
FIGURE 2 is an elevation of the ear tag shown in FIGURE 1 as viewed from beneath.
Figure 3:
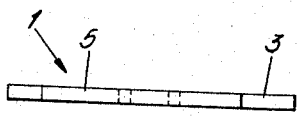
FIGURE 3 is an inverted plan view of FIGURE 2.
Figure 4:
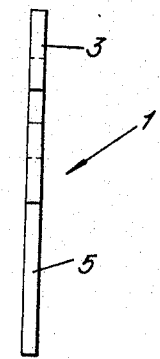
FIGURE 4 is a side elevation of FIGURE 3.

In one preferred form of the invention the ear tag 1 is formed from a suitable plastics material for example polyvinyl chloride in sheet or strip form of suitable thickness of about one sixteenth or three-thirty-seconds of an inch. The ear tag 1 is stamped or cut from this material to provide a cross-bar 2 with parallel side members 3 substantially medially positioned with respect to the cross-bar 2. The inner face 4 of each portion of the side members 3 extending out from the cross-bar 2 is inclined towards the centre thereby providing the side members 3 with gradually thickening portions towards the extremities thereof. In this way, a substantially H-shaped section is provided and the cross-bar 2 is waisted slightly or reduced in thickness by providing an appropriate curvature along the length thereof.

An indicia bearing panel 5 extends laterally from one side member 3 for the greater part of the length thereof. Various shapes of indicia bearing panel may of course be provided and the rectangular panel shown is merely an example where there are three edges provided which may be notched or otherwise marked to particulaly identify the ear tag.

I have found that for use with sheep the cross-bar 2 may have a length of about eleven-thirty-seconds of an inch, while the space between the inner faces 4 at the extremities of the side members 3 is reduced to approximately one-eighth of an inch. In this case, the overall dimensions of the tag would be approximately one and an eighth inches long and three-quarters of an inch across the side members 3. The panel 5 is approximately three-quarters of an inch long and half an inch wide.

To use the ear tag as above described a suitable sized aperture is made in the ear of the animal to be tagged, for example a sheep, and the side members 3 have the corresponding ends thereof folded towards one another until the two members approximately overlay one another with the cross-bar 2 deforming to allow this movement. The end of the side member 3 not carrying the indicating panel 5 is then passed through the hole of the ear and gripped on the other side and pulled, whereupon the other end of this member can be pulled through the ear. Because of the resilience of the plastic material, it is possible to deform it in this way, but once it has been released and the side member 3 not carrying the indicating panel has been pulled through the ear it springs back to resume its original disposition.

Because of the narrow gap between the free ends of the parallel members 3 of the H member, these ends lie close against the animal's ear obviating or minimising the possibility of twigs or stalks or other members likely to be met with while the animal is grazing or moving about getting caught and either lodging behind the ear tag causing irritation to the animal or dislodging the ear tag from the animal's ear.

During the formation of the tags, marking indicia may be incorporated on the panel in any suitable way to distinguish between one set of ear tags and another. Alternatively, the ear tags may be sold with the panel 5 left as a blank panel and the user may stamp out appropriate markings or notches extending in from the edges of the panel 5 in a similar manner to that now used to mark the ears of the sheep. It will also be appreciated the tag may be inserted through the aperture by squeezing the two ends of the member 3 not carrying the panel 5 together in passing these ends through the hole in the ear. The important requirement is that the material from which the ear tag is made is sufficiently resilient to allow this type of deformation and return to the original position, or substantially the original position, once the member 3 has been passed through the ear.

An ear tag according to the present invention may of course be formed by moulding or other suitable well-known processes of manufacturing plastic articles and in the case of such mouldings the individual markings of any particular owner could readily be incorporated in the finished ear tag. Also various coloured sections may be incorporated in the finished ear tag for example as plugs or section in the ear tag itself to allow easy identification thereof.

What I claim is:

1. A marking device or ear tag for an animal, said device or ear tag comprising a cross-bar, parallel side members substantially medially positioned and integrally formed with said cross-bar at either end thereof with said members arranged to define a substantially H-shape, each said side member having the inner face of the part extending out from said cross-bar directed inwardly towards one another thereby producing gradually thickening side members towards the extremities thereof, and said cross-bar and said side members being resilient so that they may be deformed for positioning through an aperture in the ear of the animal being tagged and when positioned said members will resume substantially the original disposition.

2. A marking device or ear tag for an animal, said device or ear tag comprising a cross-bar, parallel side members substantially medially positioned and integrally formed with said cross-bar at either end thereof, said members arranged to define a substantially H-shape and indicating means associated with one of said side members, and said cross-bar and side members being resilient so that they may be deformed for positioning through an aperture in the ear of an animal being tagged and when positioned said members will return to substantially their original dispositions.

3. A marking device or ear tag for an animal, said device or ear tag comprising a cross-bar, parallel side members substantially medially positioned and integrally formed with said cross-bar at either end thereof with said members arranged to define substantially an H-shape, each said side member having the inner face of the part extending outwardly from the cross-bar directed inwardly towards one another, thereby gradually forming thickening side members towards the extremities thereof and indicating means associated with one of said side members, and said cross-bar and side members being resilient so that they may be deformed for positioning through an aperture in the ear of an animal being tagged and when positioned said members will return to substantially their original dispositions.

4. A marking device or ear tag for an animal, said device or ear tag comprising a cross-bar, parallel side members substantially medially positioned and integrally formed with said cross-bar at either end thereof with said members arranged to define substantially an H-shape, each said side member having the inner face of the part extending outwardly from the cross-bar directed inwardly towards one another, thereby gradually forming thickening side members towards the extremities thereof, and a coloured insert associated with one of said side members, and said cross-bar and said side members being resilient so that they may be deformed for insertion through an aperture in the ear of an animal being tagged and when positioned said members will resume substantially their original disposition.

5. A marking device or ear tag for an animal, said device or ear tag comprising a cross-bar, parallel side members substantially medially positioned and integrally formed with said cross-bar at either end thereof with said members arranged to define substantially an H-shape, said side member having the inner face of the part extending outwardly from the cross-bar directed inwardly towards one another, thereby gradually forming thickening side members towards the extremities thereof, an indicia panel extending centrally outwardly from the major portion of one of said side members and being integrally formed therewith, and said cross-bar and said side members being resilient so that they may be deformed for insertion through an aperture in the ear of an animal being tagged and when positioned said members will resume substantially their original disposition.

6. A marking device or ear tag for an animal, said device or ear tag comprising a cross-bar, parallel side members substantially medially positioned and integrally formed with said cross-bar at either end thereof with said members arranged to define substantially an H-shape, each said side member having the inner face of the part extending outwardly from the cross-bar directed inwardly towards one another, thereby gradually forming thickening side members towards the extremities thereof, an indicia panel extending centrally outwardly from the major portion of one of the side members and being integrally formed therewith, said indicia panel being duly marked with distinguishing markings formed therein and said cross-bar and said side members being resilient so that they may be deformed for insertion through an aperture in the ear of an animal tagged and when positioned said members will resume substantially their original disposition.

References Cited

UNITED STATES PATENTS

| | | | |
|---|---|---|---|
| 700,483 | 5/1902 | Emeis | 40—302 |
| 1,606,881 | 11/1926 | Lenk | 40—302 |
| 2,285,391 | 6/1942 | Clark | 40—140 X |
| 2,972,828 | 2/1961 | Dumbrell | 40—302 |

EUGENE R. CAPOZIO, *Primary Examiner.*

W. H. GRIEB, *Assistant Examiner.*